United States Patent [19]

Cooper

[11] 4,131,786

[45] Dec. 26, 1978

[54] REMOTELY CONTROLLABLE ELECTRIC OVEN

[76] Inventor: James Cooper, 2802 Hollywood Rd., Falls Church, Va. 22043

[21] Appl. No.: 721,399

[22] Filed: Sep. 8, 1976

[51] Int. Cl.$^2$ ............................................. H05B 1/02
[52] U.S. Cl. ..................................... 219/487; 219/506
[58] Field of Search .................. 219/10.55 R, 10.55 B, 219/10.55 F, 483, 486, 487, 492, 494, 506; 99/325, 327, 332, 342; 236/15 A; 340/147 R, 147 B, 147 LP, 147 MT

[56] References Cited

U.S. PATENT DOCUMENTS

| | | | |
|---|---|---|---|
| 3,497,656 | 2/1970 | Staats et al. | 219/10.55 F |
| 3,932,723 | 1/1976 | Tamano et al. | 99/325 |
| 3,974,472 | 8/1976 | Gould, Jr. | 219/506 |
| 3,988,577 | 10/1976 | Leitner et al. | 219/506 |
| 4,011,428 | 3/1977 | Fosnough et al. | 219/10.55 B |
| 4,024,502 | 5/1977 | Eberwein et al. | 340/147 R |

*Primary Examiner*—J. V. Truhe
*Assistant Examiner*—Clifford C. Shaw
*Attorney, Agent, or Firm*—Birch, Stewart, Kolasch & Birch

[57] ABSTRACT

An electric oven which has a plurality of heating positions for controllably heating foodstuff thereon includes temperature selection means for locally and remotely selecting the heating temperature, and timing means for locally and remotely setting the heating duration of each of the heating positions, respectively. Display means are provided for selectively showing the remaining heating duration locally and remotely following setting of the timing means for the heating duration of the cooking positions, respectively, and switching means are employed for selectively turning the heating positions on and off in response to the respective preset heating durations.

3 Claims, 4 Drawing Figures

REMOTELY CONTROLLABLE ELECTRIC OVEN

BACKGROUND OF THE INVENTION

1. Field of the Invention

The field of the present invention relates to a remotely controllable electric oven.

2. Description of the Prior Art

There are known timer systems for a cooking apparatus or the like, an electric oven control system, a domestic appliance such as a self-contained wall-mounted oven, an oven heating system, an electric oven for rapidly heating therein frozen convenience food, a broiler apparatus, and an automatic oven heat control by weight and type of roast. None of the prior art ovens show a remote control oven unit for controlling the oven proper.

SUMMARY OF THE INVENTION

I accordingly provide an electric oven which has a plurality of heating positions for controllably heating foodstuff thereon, respectively, which include temperature selection means for locally and remotely selecting the heating temperature and timing means for locally and remotely setting the heating duration of each of the heating positions, respectively. I additionally provide display means for selectively showing the remaining heating duration both locally and remotely following setting of the timing means for the heating duration of the cooking positions, respectively, and switching means for selectively turning the heating positions on and off in response to the respective preset heating durations. A plurality of walls of the oven define a broiling compartment, and the plurality of heating positions include the broiler compartment, a plurality of electric burners and at least one microwave oven. I additionally provide a remote console and communication means between the oven and the remote console for the remote control of the oven. Inhibit means are preferably provided for inhibiting the remote control of the oven following a conflicting local control thereof.

BRIEF DESCRIPTION OF THE DRAWING

My invention will be better undertood with reference to the accompanying drawing in which.

DETAILED DESCRIPTION OF THE PREFERRED EMBODIMENT

Figure 1:
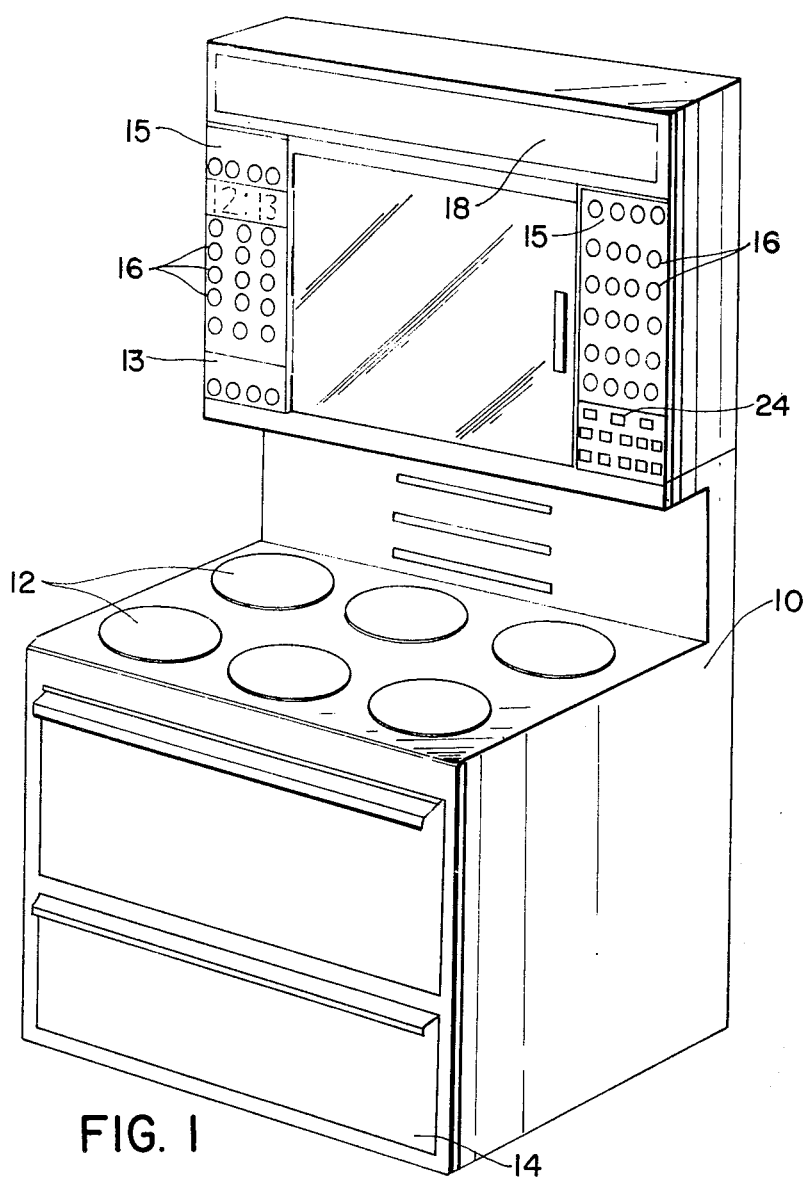
FIG. 1 shows a perspective view of the oven, according to my invention.
Figure 2:
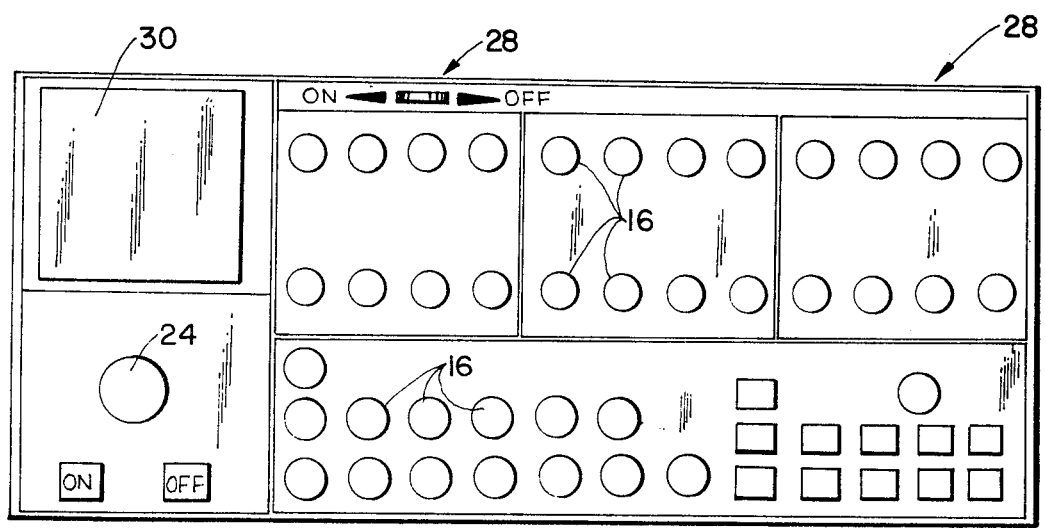
FIG. 2 shows a view of the control panel of the remote control unit for the oven.
Figure 3:
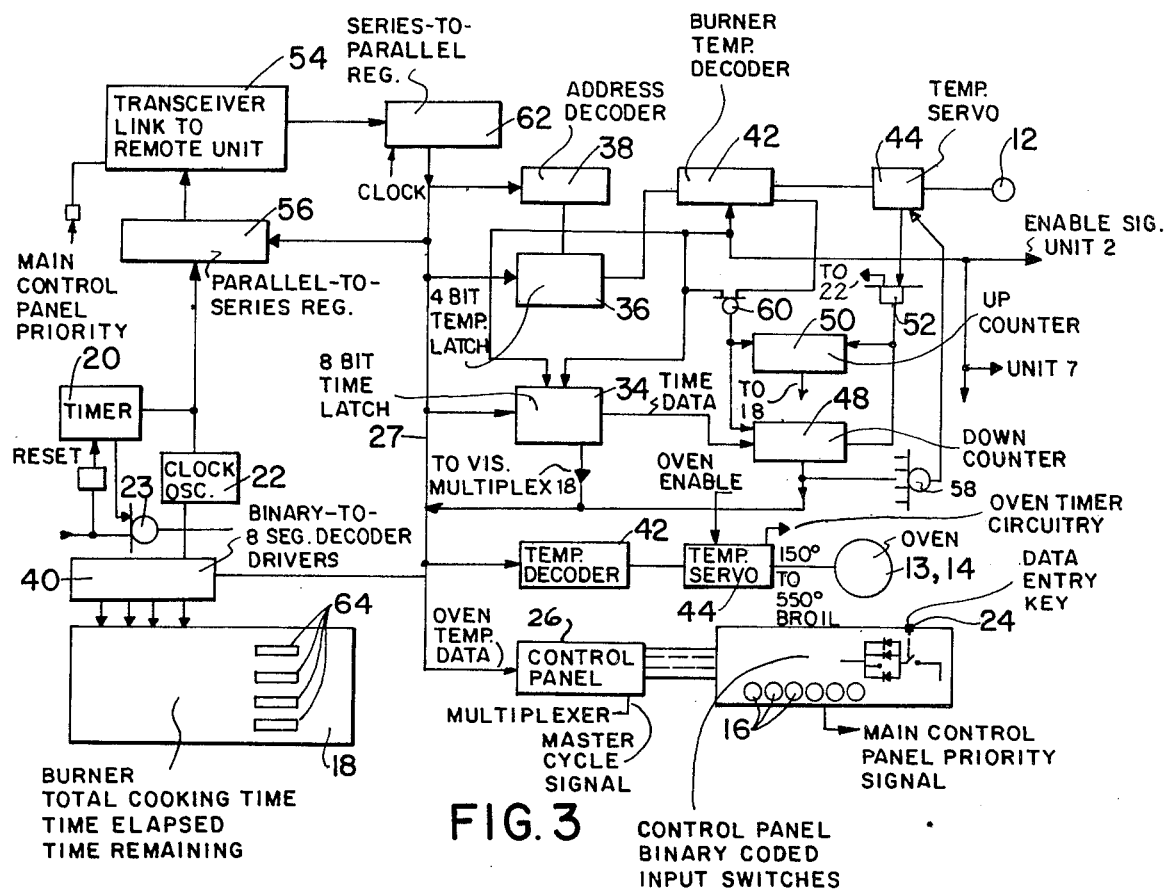
FIG. 3 shows a schematic circuit diagram of the oven.
Figure 4:
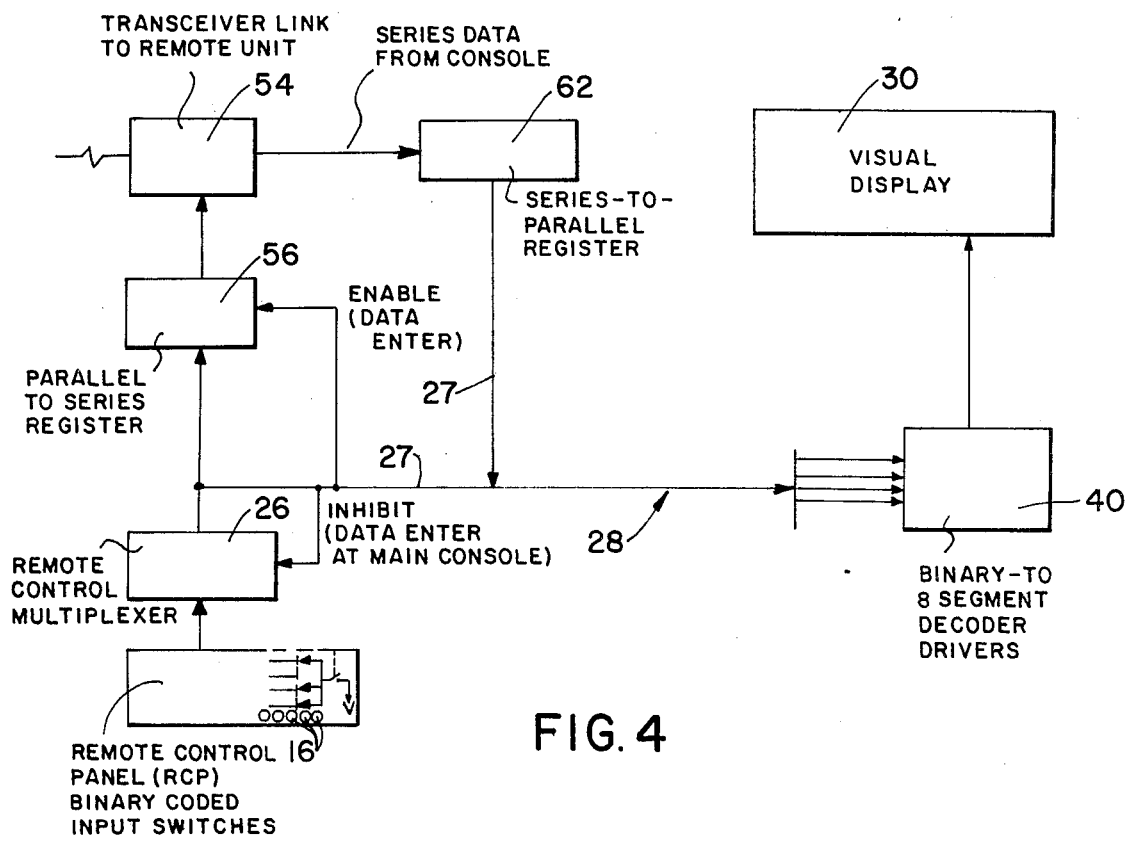
FIG. 4 shows a schematic circuit diagram of the remote control unit for the oven.

An oven 10 has a plurality of cooking positions in the form of electrical heaters 12, a microwave oven 13 and a broiler compartment 14. The oven has a control panel 15 on which there are disposed a plurality of cooking control keys 16. The cooking control keys 16 select one of the cooking positions 12, 13 or 14, and also serve to set the temperature of the selected cooking position, as well as the duration of the cooking. Both the set temperature and the set duration of the ON time of each cooking position 12, 13 or 14 can be displayed on a local display unit 18. A timer 20 which derives a clock signal from a clock oscillator 22, sets the timing reference for a control system of the oven, and upon depression of a data entry key 24 cooking position, temperature and cooking duration selections previously made on selected control keys 16 are entered into the control system of the oven 10. The timer 20 also transmits a master cycle signal via an OR gate 23 to the control panel multiplexer 26; entry of data followed by actuation of the data entry key 24 in the absence of an inhibit signal will reset the timer 20 to zero. Depression of the data entry key 24 also activates a multiplexer 26 to feed all information from the keys 16 in a binary coded format onto a main data buss 27, while simultaneously generating a main-panel priority signal to prevent any interference from a remote control unit 28, used for remote control of the oven 10. Data placed on the main buss 27 is displayed on the local display unit 18, and on a remote display unit 30. Communication from the oven 10 to the remote unit 28 can be made via a transceiver link 54, which may consist of a cable or a radio link.

Since time is to be controlled up to 3 hours in 1 minute increments, and temperature is to be controlled up to 550° F at about 35° increments, data for time is quantized to 8 bits, and data for temperature is quantized to 4 bits. The binary time information is stored in an 8 bit time-memory or latch 34, and temperature is stored in a 4 bit temperature-memory or latch 36, one respective latch being provided for each cooking position 12, 13 or 14. The latches 34 and 36 are enabled and selected by a particular lead from a cooking-or heating-position address-decoder 38, a particular cooking-position address code corresponding to a particular one of the keys 16 on the control panel 15. The address is transmitted by the selected key 16 onto the main data buss 27.

The data stored in the eight temperature latches 36 are continuously fed to eight burner-temperature decoders 42, respectively, to set respective temperature servo's 44. Although the implementation illustrated and described is one of parallel decoder operation, it could equally well be implemented by multiplexing the transmitted data and sampling it at a single burner-temperature decoder-demultiplexer.

Time data are loaded into, and stored in the time latches 34 and fed therefrom into eight down-counters 48, respectively. Upon actuation of the data entry key 24, respective up-counters 50 are reset to zero upon being actuated by the proper enable signal from respective decoders 38.

Upon the selected temperature servo 44 being set to a desired temperature position, it sends an enabling signal to an AND gate 52 which allows a clock pulse from the clock oscillator 22 to be fed to the up-counter 50, as well as to a down-counter 48, so that both the elapsed time, and the remaining time for a set cooking duration is computed continuously. The data contents of the counters 48 and 50, and of the time latches 34 and 36 are available on the main data buss 27 to provide information to the local visual display unit 18; these data are also fed to a parallel-to-series register 56 for further transmission to the remote display unit 30.

When the down counter 48 is pulsed to zero, an OR gate 58 is set to LOW, thus setting the corresponding temperature servo 44 to the OFF position. In the event the temperature data are reset to OFF at any arbitrary time due to an input by an appropriate key 16, the OFF signal from one of the burner temperature decoders 42 will actuate an OR gate 60, thus resetting the corresponding down counter 48 to zero, thereby turning the appropriate cooking position or burner 12 or 14 off.

If any data for a cooking position 12, 13 or 14 is entered on the keys 16 of the control panel 15, it will inhibit any conflicting data from the remote control unit 28 by inhibiting a series-to-parallel register 62 via a main control panel priority signal transmitted together with control data by actuation of one of the keys 16, the series-to-parallel register 62 being used to convert parallel data from the remote unit 28 into serial data.

The master cycle signal generated by the timer 20 sequences the control panel multiplexer 26 each 20 seconds so as to sample the status of each of the cooking positions 12, 13 and 14, except when inhibited by a data entry signal from the data entry key 24. The sequencing of the multiplexer 26 provides position information on the local visual display unit 18, or on the remote display unit 30 derived from the control panel 15; time information is supplied to the visual display units 18 and 30 from the counters 48 and 50. Upon decoding of the data in a decoder-driver 40 feeding a corresponding visual display unit, light emitting diodes 64 or the like are actuated for display of the data.

The master cycle signal on the main data buss 27 fed to the parallel-to-series register 56 is transmitted therefrom to the remote unit 28 for display. An inhibit signal from the main control panel 15 to the series-to-parallel register 62 prevents simultaneous and conflicting actuation of the cooking positions from the remote control unit 28. Data from the latter is received and processed through the series-to-parallel register 62, and fed therefrom to the main data buss 27.

The command and control modules are all standard components available commercially, for example, from the Fairchild Semiconductor Corporation. Thus the multiplexer 26 is a Fairchild module 9313, each of the visual display units is a module 9312, the memory latches 34 and 36 can be implemented by unit 93164, the parallel-to-series register 56 by unit 93164, and the counters 48 and 50 can be made up of units 9360.

Although the invention has been described with respect to a preferred version thereof, it is to be understood that it is not to be so limited since changes can be made therein which are within the full intended scope of the appended claims.

I claim:

1. In a system for controlling and monitoring an electric oven having a plurality of heating locations within a substantially common housing for controllably heating foodstuff thereat for selected durations comprising:
   a. first control panel means mounted within said common housing including,
      1. temperature selection means for selecting the heating temperature at each of said heating locations,
      2. timing means for setting the heating duration at each of said heating locations, and
      3. display means for illustrating the selected heating duration of each of said respective heating locations set by said timing means and the time remaining of each of said selected heating durations;
   b. second control panel means separate and apart from said common housing and said first control panel means and movable with respect thereto, said second control panel means including,
      1. timing means for setting the heating duration at each of said heating locations, and
      2. display means for illustrating the heating duration selected either by said timing means in said first control panel means or said timing means in said second control panel means and the time remaining of each of said selected heating durations;
   switching means for selectively turning said respective heating locations ON and OFF in response to signals from either of said timing means; and
   communication means between said first and second control panel means for transmitting data from said timing means of said second control panel means to said electric oven and transmitting data from said first control panel means to the display means of said second control panel means.

2. An electric oven according to claim 1 wherein said communication means comprises:
   a first radio transceiver means in said first control panel means; and
   a second radio transceiver means in said second control panel means.

3. An electric oven according to claim 1 wherein said second control panel means further includes:
   temperature selection means for selecting the heating temperature at each of said heating locations.

* * * * *